United States Patent
Evans et al.

(10) Patent No.: US 9,168,855 B2
(45) Date of Patent: Oct. 27, 2015

(54) COMPOSITE COMPONENT

(71) Applicant: BASF SE, Ludwigshafen (DE)

(72) Inventors: Jonathan A. Evans, Canton, MI (US);
Scott C. Schlicker, Ferndale, MI (US);
Marios Lambi, South Lyon, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/730,224

(22) Filed: Dec. 28, 2012

(65) Prior Publication Data

US 2013/0119743 A1    May 16, 2013

Related U.S. Application Data

(62) Division of application No. 11/837,282, filed on Aug. 10, 2007.

(60) Provisional application No. 60/822,319, filed on Aug. 14, 2006.

(51) Int. Cl.
*B60N 2/64* (2006.01)
*B60N 2/68* (2006.01)
(Continued)

(52) U.S. Cl.
CPC ............ *B60N 2/64* (2013.01); *B29C 45/14786* (2013.01); *B60N 2/68* (2013.01); *B29L 2031/771* (2013.01); *Y10T 428/31504* (2015.04); *Y10T 428/31732* (2015.04)

(58) Field of Classification Search
CPC ....... B60N 2/64; B60N 2/68; B29C 45/14786
USPC .................................................... 297/452.18
See application file for complete search history.

(56) References Cited

U.S. PATENT DOCUMENTS 3,848,925 A    11/1974 Harder
4,832,408 A    5/1989 Bertsch et al.
(Continued)

FOREIGN PATENT DOCUMENTS

DE    4208150 A1    9/1993
DE    19757060 A1    6/1999
(Continued)

OTHER PUBLICATIONS

English language translation and abstract for JP 2004-016710 extracted from PAJ database dated Apr. 11, 2011, 19 pages.
(Continued)

*Primary Examiner* — Anthony D Barfield
(74) *Attorney, Agent, or Firm* — Howard & Howard Attorneys PLLC

(57) ABSTRACT

A composite component such as a seat back for a vehicle comprises a support portion and at least one reinforcing composite layer. The support portion comprises a thermoplastic material and the reinforcing composite layer comprises a polymeric material impregnating a plurality of fibers. The polymeric material of the reinforcing composite layer is integrated with the thermoplastic of the support portion. A method of forming the composite component includes placing the composite layer into a mold, heating the thermoplastic material to a molten state, and disposing the thermoplastic material in the molten state into contact with the composite layer. The method further includes promoting interaction between the thermoplastic material and the polymeric material to integrate the support portion and the reinforcing composite layer. The thermoplastic material supports the reinforcing composite layer and the reinforcing composite layer reinforces the thermoplastic material to prevent failure when subjected to a load.

31 Claims, 8 Drawing Sheets

(51) Int. Cl.
  *B29C 45/14*   (2006.01)
  *B29L 31/00*   (2006.01)

(56) References Cited

U.S. PATENT DOCUMENTS

| | | | |
|---|---|---|---|
| 4,959,189 A | 9/1990 | Rohrbacher et al. |
| 5,029,942 A | 7/1991 | Rink |
| 5,085,928 A | 2/1992 | Krueger |
| 5,100,204 A | 3/1992 | Makihara et al. |
| 5,190,803 A | 3/1993 | Goldbach et al. |
| 5,308,570 A | 5/1994 | Hara et al. |
| 5,375,914 A | 12/1994 | Donnelly |
| 5,506,029 A | 4/1996 | Hara et al. |
| 5,531,950 A | 7/1996 | Kimura et al. |
| 5,744,210 A | 4/1998 | Hofmann et al. |
| 5,895,096 A | 4/1999 | Massara |
| 5,940,991 A | 8/1999 | Cabalquinto |
| 5,988,757 A | 11/1999 | Vishey et al. |
| 6,056,366 A | 5/2000 | Haynes et al. |
| 6,059,369 A | 5/2000 | Bateson et al. |
| 6,074,004 A | 6/2000 | Carmichael |
| 6,412,855 B1 | 7/2002 | Cantineau et al. |
| 6,421,979 B1 | 7/2002 | Fischer et al. |
| 6,423,388 B1 | 7/2002 | Bateson et al. |
| 6,558,604 B1 | 5/2003 | Beckmann |
| 6,644,722 B2 | 11/2003 | Cooper |
| 6,739,673 B2 | 5/2004 | Gupta et al. |
| 6,748,876 B2 | 6/2004 | Preisler et al. |
| 6,767,067 B2 | 7/2004 | Fourrey et al. |
| 6,908,132 B2 | 6/2005 | Bauhof |
| 6,994,379 B2 | 2/2006 | Zoellner |
| 7,125,466 B2 | 10/2006 | Cooper et al. |
| 7,377,586 B2 | 5/2008 | Evans |
| 7,677,644 B2 | 3/2010 | Wen et al. |
| 7,677,664 B2 | 3/2010 | Beneker et al. |
| 7,837,271 B2 | 11/2010 | Galbreath et al. |
| 8,511,748 B2 * | 8/2013 | McLeod et al. ............ 297/216.1 |
| 2002/0094427 A1 | 7/2002 | Edwards et al. |
| 2007/0238378 A1 | 10/2007 | Conover et al. |
| 2009/0058166 A1 | 3/2009 | Boes |
| 2010/0291821 A1 | 11/2010 | Kirchner et al. |

FOREIGN PATENT DOCUMENTS

| | | |
|---|---|---|
| DE | 19827563 A1 | 12/1999 |
| JP | 2003169725 | 6/2003 |
| JP | 2004016710 | 1/2004 |
| WO | 03016091 A1 | 2/2003 |
| WO | 2010055482 A1 | 5/2010 |

OTHER PUBLICATIONS

English language translation and abstract for JP 2003-169725 extracted from PAJ database dated Apr. 11, 2011, 48 pages.

\* cited by examiner

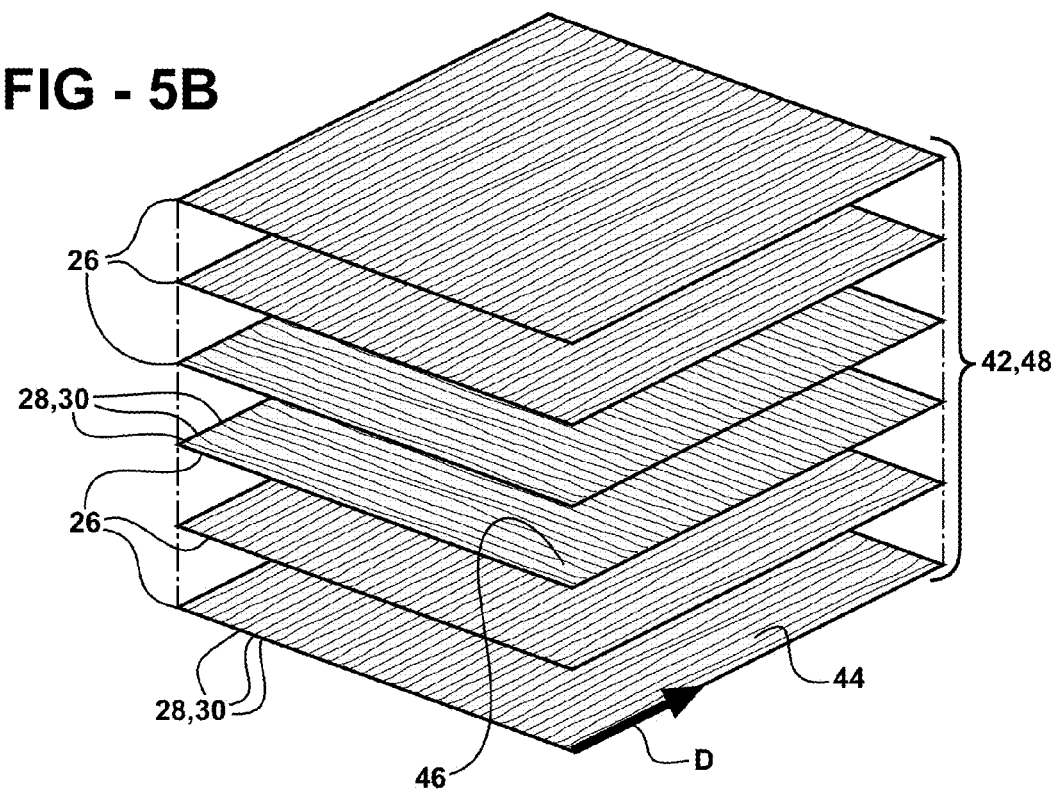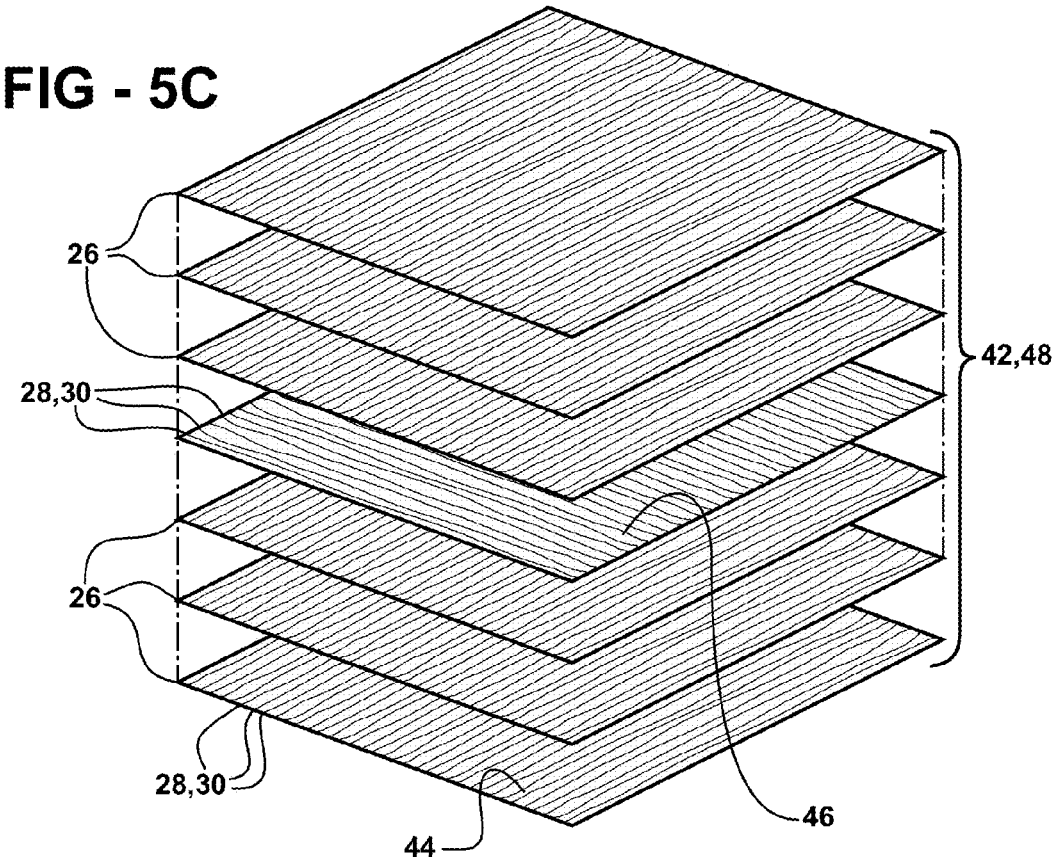

COMPOSITE COMPONENT

CROSS-REFERENCE TO RELATED APPLICATIONS

The subject patent application is a divisional application of U.S. patent application Ser. No. 11/837,282 filed Aug. 10, 2007, which claims priority to and all the benefits of U.S. Provisional Patent Application No. 60/822,319 filed on Aug. 14, 2006, the entire specifications of both of which are incorporated herein by reference.

BACKGROUND OF THE INVENTION

1. Field of the Invention

The present invention is related to a composite component including a support portion and a reinforcement composite layer and a method of forming the same.

2. Description of the Related Art

A composite component is formed of at least two diverse materials that are combined together to form a single unit. Composite components are used in a variety of settings including seat backs for a vehicle and structural beams. Seat backs for vehicles are assembled in a seat assembly and the seat assembly is disposed in the vehicle, such as an automobile, for supporting occupants of the vehicle.

Seat backs must meet structural requirements by having sufficient stiffness to support repeated loads commonly exerted on the seat back such as loads exerted by passengers. Seat backs must also have sufficient impact strength to withstand cracking or breaking during impacts such as impacts created by cargo moving in the vehicle and occupant loads during crash events. For example, cargo may move in the vehicle if the cargo is not secured and the vehicle is involved in an accident.

As such, the seat back is generally formed from metal such as steel. Steel meets the structural requirements by providing sufficient stiffness and sufficient impact strength to satisfy the above mentioned concerns. However, the steel seat back is comprised of several individual components and the assembly of these components makes such a construction relatively expensive. Additionally, steel is a relatively heavy material. Generally in vehicles, heavy material such as steel is avoided, where possible, in favor of lighter materials. With respect to the seat back, replacing heavy material with lighter material increases fuel economy of the vehicle. In addition, lighter material is more easily handled in the assembly process of the seat back and the assembly process of the vehicle.

It is known in the art to form the seat back from a relatively light material such as plastic. Plastic is beneficial in such an application not only because plastic is lighter than steel, but also because seat back features may be integrated into the frame portion made of plastic. Such seat back features include headrest guides that are integrally formed on the frame portion during an injection molding process. Also, plastic has the benefit of being able to produce a seat back in a single injection molded process.

However, the use of plastic in such applications is limited due to the relatively low stiffness and low impact strength of plastic in comparison to steel. Seat backs made of plastic must be thicker than those made of steel to achieve sufficient stiffness and impact strength. As a result, seat backs made from plastic may be too thick to accommodate packaging constraints in vehicles.

It is known in the art to form seat backs from composite materials to increase the stiffness and impact strength of the seat back. An example of such a seat back includes a plastic support portion and a metal reinforcing portion attached to the support portion for reinforcing the support portion. Adequate interaction between the plastic of the support portion and the metal of the reinforcement portion is difficult to obtain. In addition, further weight reduction could be obtained by replacing the metal reinforcement portion with a lighter material. Further, such a seat back is not easily recyclable because the seat back is formed of both plastic and metal.

Accordingly, it would be desirable to manufacture a composite component such as a seat back having the relatively light weight and the capability of integration of features as provided by the plastic while also having sufficient stiffness and impact strength without significantly increasing the thickness of the seat back. It would also be desirable to manufacture a composite component which is easily recyclable. Further, it would also be desirable to establish a method of increasing the stiffness and the impact strength of the composite component while also improving the interaction between the materials of the composite component.

SUMMARY OF THE INVENTION AND ADVANTAGES

The present invention is a composite component. The composite component comprises a support portion comprising a thermoplastic material and presents a connecting end. At least one reinforcing composite layer abuts the connecting end of the support portion. The at least one reinforcing composite layer comprises a polymeric material and a plurality of fibers impregnated in the polymeric material. The polymeric material presents a connecting portion of the at least one reinforcing composite layer integrated with the connecting end of the support portion.

The present invention also includes a method of forming the composite component including the support portion comprising the thermoplastic material and the reinforcing composite layer including at least one composite reinforcing layer comprising the polymeric material and the plurality of fibers impregnated in the polymeric material. The method comprises placing the composite layer into a mold. The method further includes heating the thermoplastic material to a molten state and disposing the thermoplastic material in the molten state into contact with the reinforcing composite layer. The method further includes promoting interaction between the thermoplastic material of the support portion and the polymeric material of the composite layer to integrate the support portion and the reinforcing composite layer.

Accordingly, the thermoplastic material that forms the connecting end of the support portion is integrated with the polymeric material that forms the connecting portion of the reinforcing composite layer. The combination of the thermoplastic material and the reinforcing composite layer results in an advantageous combination with the thermoplastic material supporting the reinforcing composite layer and with the reinforcing composite layer reinforcing the thermoplastic material. Specifically, the thermoplastic material of the support portion by itself may be subject to failure when subjected to a load and the reinforcing composite layer by itself is subject to failure when subjected to a load. When the thermoplastic material and the reinforcing composite layer are integrated with each other, the thermoplastic material supports the reinforcing composite layer and the reinforcing composite layer reinforces the thermoplastic material to prevent failure when subjected to a load.

Further, the reinforcing composite layer is relatively light compared to the prior art thereby decreasing the weight of the composite component, hi addition, the thermoplastic material of the support portion and the polymeric material of the reinforcing composite layer are easily integrated with each other to combine the support portion and the reinforcing composite layer into a single unit. Further, due to the types of materials used to form the composite component, the composite component is easily recyclable because the thermoplastic material and the reinforcing composite layer are recyclable together thereby eliminating any need to separate diverse materials that are not recyclable together.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5B is an exploded view of another embodiment of the reinforcing composite layer;

FIG. 5C is an exploded view of another embodiment of the reinforcing composite layer;

DETAILED DESCRIPTION OF THE INVENTION

Figure 1:
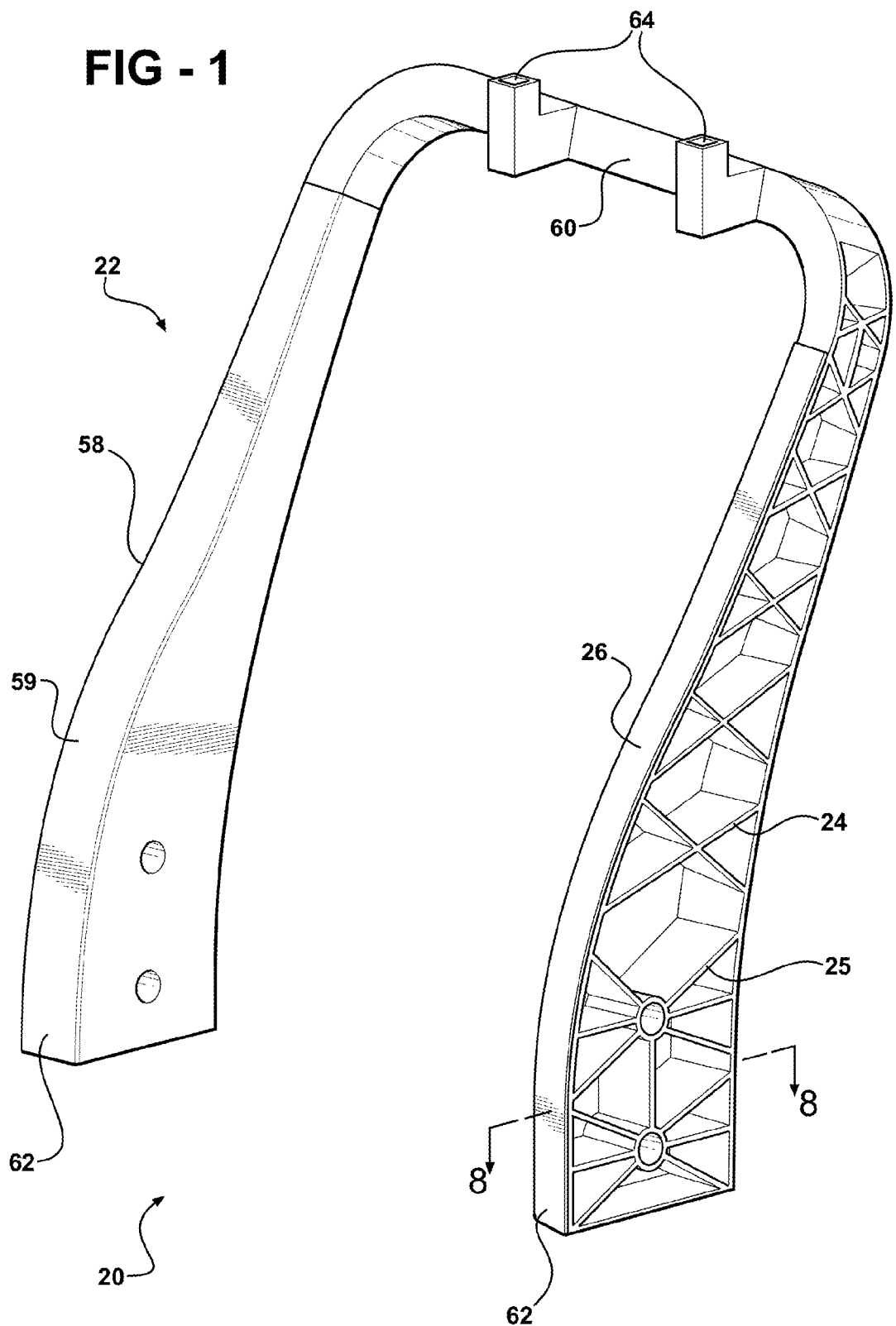
FIG. 1 is a perspective view of a composite component in the form of a seat back including a support portion and a reinforcing composite layer.

Referring to the Figures, wherein like numerals indicate corresponding parts throughout the several views, a composite component, is shown generally at 20. It should be appreciated that the composite component 20 may be any type of composite component 20 for a variety of uses. For example, the composite component 20 may be a seat back 22 or a structural beam (not shown). In the embodiments shown in the Figures, the composite component 20 is the seat back 22 for a vehicle, such as an automobile. The seat back 22 is assembled in a seat assembly (not shown) including a seat bottom extending generally horizontally for supporting a seated passenger or cargo. It should be appreciated that the seat back 22 may be used in any type of vehicle including, for example, a bus, an airplane, and a boat. Although not required, the seat back 22 typically includes foam surrounding the support portion 24 and the reinforcing composite layer 26 and a covering over the foam.

As shown in FIGS. 1-3 and 8A-C, the composite component 20 includes a support portion 24 and at least one reinforcing composite layer 26. As described additionally below, the composite component 20 may have more than one reinforcing composite layer 26. The support portion 24 comprises a thermoplastic material and the reinforcing composite layer 26 is integrated with the thermoplastic material of the support portion 24. In other words, as will be discussed below, the support portion 24 and the reinforcing composite layer 26 are mounted to each other to form a single unit. The reinforcing composite layer 26 is thin relative to the support portion 24. Each of the reinforcing composite layers 26 may be approximately 0.1 to 0.5 mm thick.

Figure 5A:
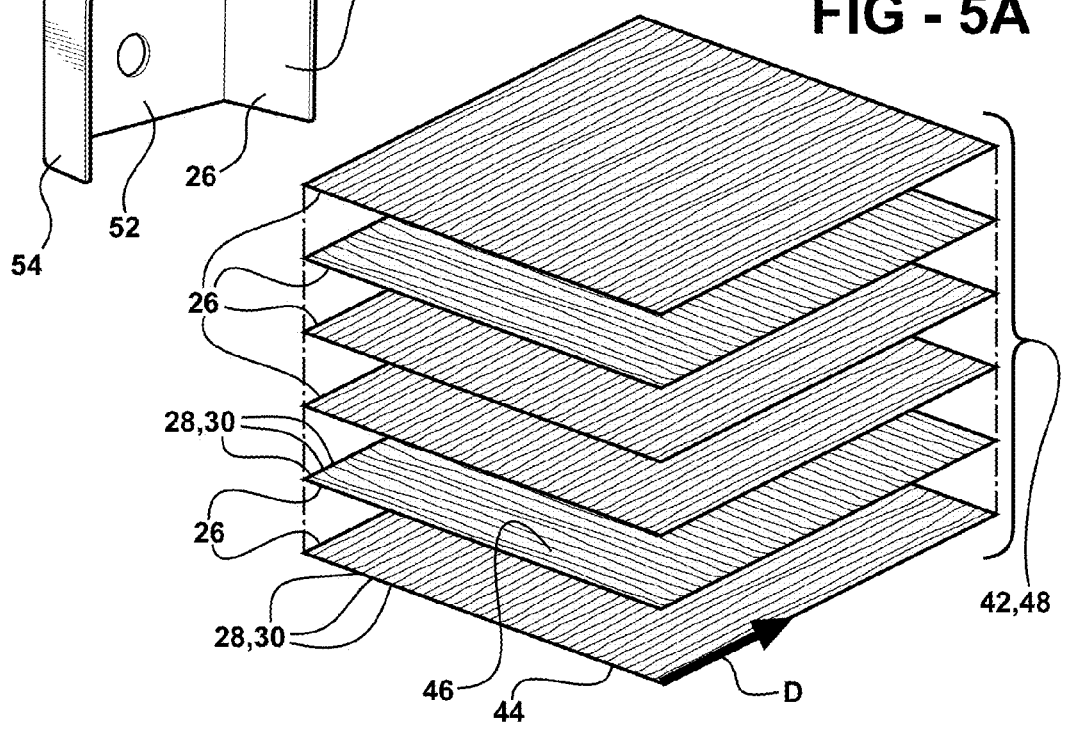
FIG. 5A is an exploded view of one embodiment of the reinforcing composite layer.
Figure 6:
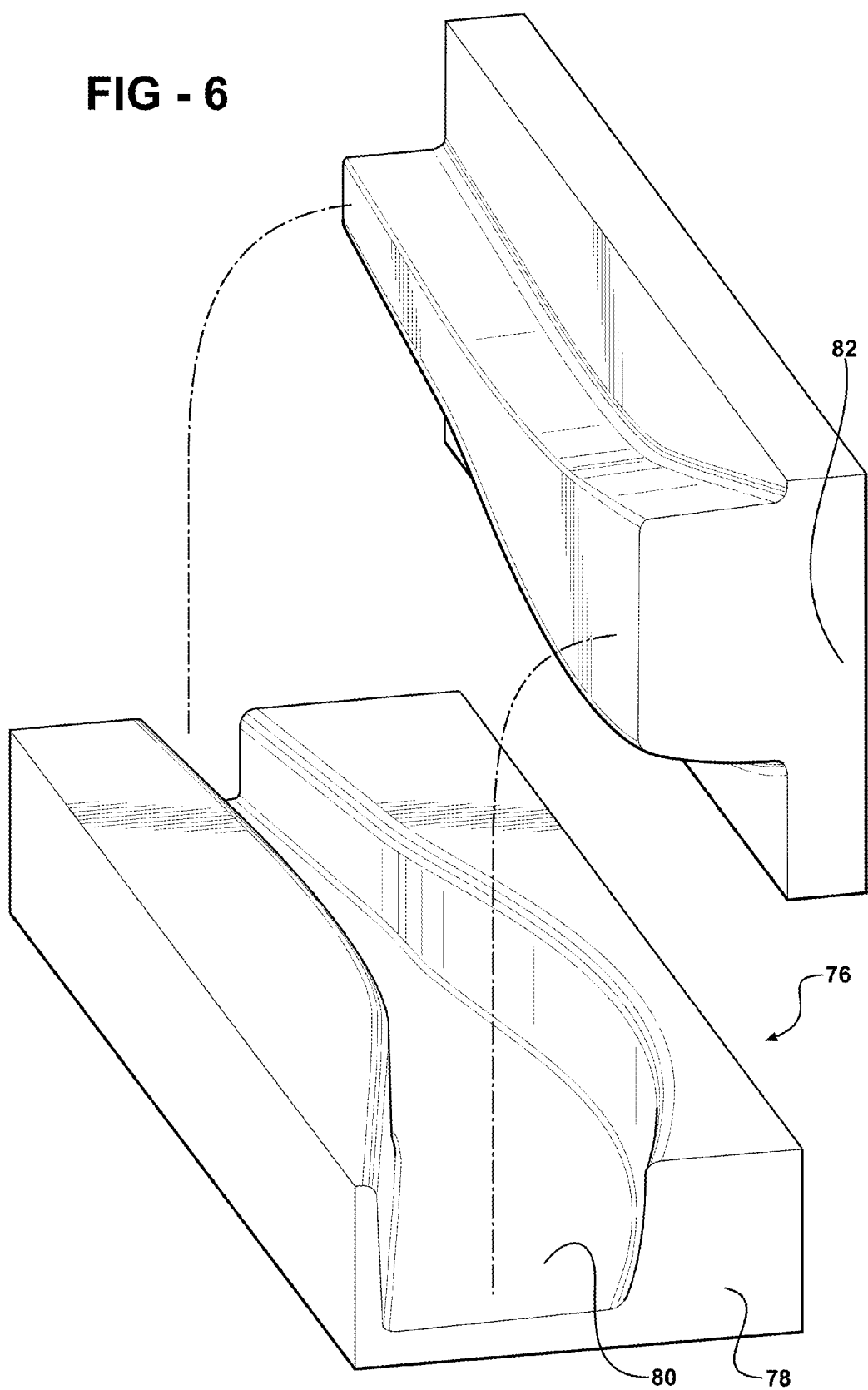
FIG. 6 is a perspective view of a preforming mold.

As best shown in FIGS. 5A-C, the reinforcing composite layer 26 comprises a polymeric material and a plurality of fibers 28 impregnated in the polymeric material. The reinforcing composite layer 26 may be integrated with the thermoplastic material in a variety of ways. For example, the reinforcing composite layer 26 may be in the form of a continuous fiber reinforced mat that is preformed and subsequently integrated with the thermoplastic material. An example of such a continuous fiber reinforced mat is that which is commercially available from Baycomp Canada in Burlington, Ontario, Canada under the tradename CFRT. Alternatively, for example, the plurality of fibers 28 and the polymeric material are simultaneously integrated with the thermoplastic material.

Figure 8A:
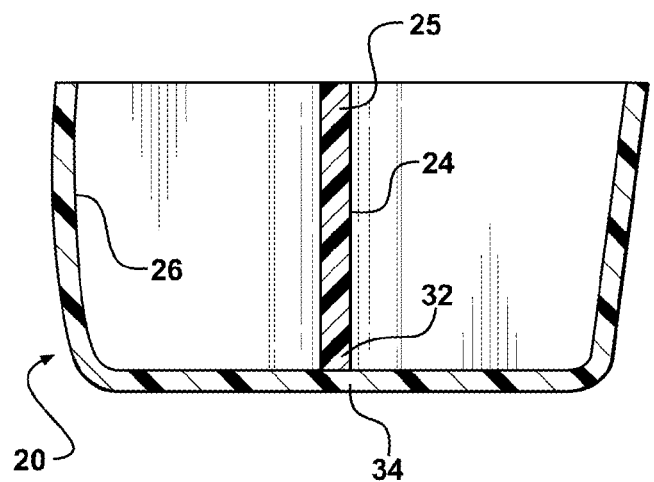
FIG. 8A is a cross-sectional view of a rib and the reinforcing composite layer along line 8-8 of FIG. 1.
Figure 8B:
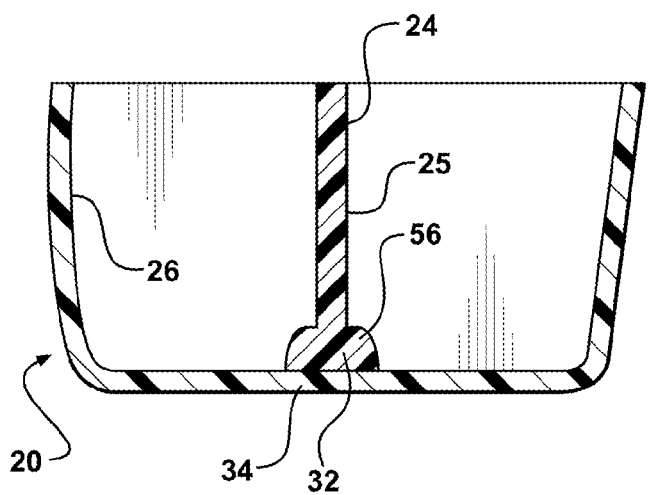
FIG. 8B is a cross-sectional view of another embodiment of the rib.
Figure 8C:
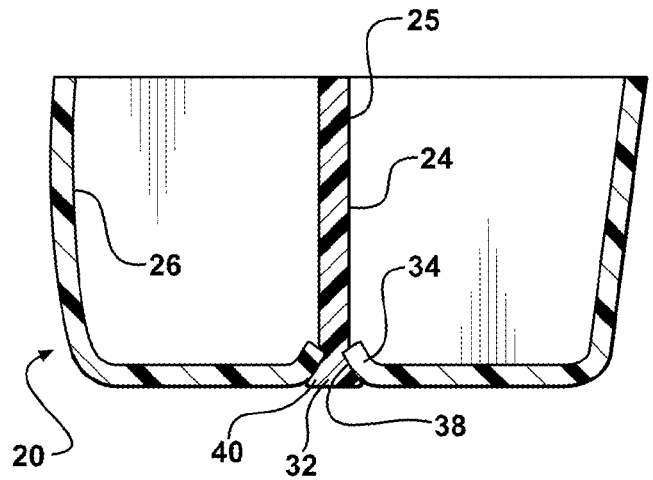
FIG. 8C is a cross-sectional view of another embodiment of the rib.

As best shown in FIGS. 8A-C, the support portion 24 presents a connecting end 32 and the reinforcing composite layer 26 abuts the connecting end 32 of the support portion 24. Specifically, the polymeric material defines a connecting portion 34 of the reinforcing composite layer 26 and the connecting portion 34 is integrated with the connecting end 32 of the support portion 24. The polymeric material of the reinforcing composite layer 26 is integrated with the thermoplastic material of the support portion 24 to attach the reinforcing composite layer 26 and the support portion 24 to each other.

The combination of the thermoplastic material of the support portion 24 and the reinforcing composite layer 26 attached to each other results in an advantageous combination. Specifically, the thermoplastic of the support portion 24 by itself may fracture when subjected to a load. The reinforcing composite layer 26 may buckle and/or fracture when subjected to a load. When the thermoplastic material and the reinforcing composite layer 26 are integrated with each other, the thermoplastic material supports the reinforcing composite layer 26 to prevent buckling and/or fracturing of the reinforcing composite layer 26, i.e., to provide torsional stiffness, and the reinforcing composite layer 26 reinforces the thermoplastic material to prevent fracturing of the thermoplastic material under a load. In other words, the reinforcing composite layer 26 provides increased stiffness and impact strength to the composite component 20.

Preferably the thermoplastic material is of the type capable of being injection molded such that the thermoplastic material may be molded into variety of configurations and shapes. As known to one skilled in the art, plastic injection molding is performed by heating the thermoplastic material such that the thermoplastic material is in a molten state and injecting the thermoplastic material into a mold 66, and more specifically, an injection mold 36. For example, the injection mold 36 is shown schematically in FIG. 7. The thermoplastic material is then cooled to solidify the thermoplastic material and the thermoplastic material is thereafter removed from the injection mold 36. The thermoplastic material is preferably of the type that produces a net-shaped product resulting from injection molding. As known to one skilled in the art, the net-shaped product is defined as a product of injection molding that is finished when removed from the injection mold 36. In other words, the composite component 20 is finished and requires no secondary finishing operations after removal from the injection mold 36.

For example, the thermoplastic material of the support portion 24 comprises a first nylon. Specifically, for example, the nylon is fiber reinforced nylon and an example of such fiber reinforced nylon is a glass fiber reinforced nylon that is commercially available from BASF Corporation in Florham Park, N.J. under the tradename Ultramid® TG7S PA6. It should be appreciated that the support portion 24 may be formed from any type of suitable thermoplastic material, reinforced or not, without departing from the nature of the present invention.

The polymeric material of the reinforcing composite layer 26 typically comprises a second thermoplastic material different than the thermoplastic material of the support portion 24. In one embodiment, the second thermoplastic material is a second nylon different than the first nylon of the support portion 24. Alternatively, the first nylon of the support portion 24 and the second nylon of the reinforcing composite layer 26 are the same type of material. It should be appreciated that the polymer may be a thermoset material without departing from the nature of the present invention.

As best shown in FIGS. 8A and 8B, the connecting end 32 of the support portion 24 is melt bonded to the connecting portion 34 of the reinforcing composite layer 26. In such a configuration, preferably the second thermoplastic material of the reinforcing composite layer 26 has a lower melting temperature than the thermoplastic of the support portion 24. Specifically, the thermoplastic material of the support portion 24 has a first melting temperature and the second thermoplastic material of the reinforcing composite layer 26 has a second melting temperature with the first melting temperature greater than the second melting temperature. For example, the first melting temperature is 560-600° F. and the second melting temperature is 400-560° F.

In the configuration where the connecting end 32 is melt bonded to the connecting portion 34, the integration of the connecting end 32 and the connecting portion 34 preferably extends along a relatively long uninterrupted interface. This uninterrupted interface increases the strength of the integration between the connecting end 32 and the connecting portion 34.

In the configuration where the connecting end 32 is melt bonded to the connecting portion 34, preferably the thermoplastic material of the support portion 24 and the second thermoplastic material of the reinforcing composite layer 26 are compatible such that the thermoplastic material and the second thermoplastic material melt together and integrate with one another.

In one configuration, the composite component 20 includes a polyurethane layer dispose between the thermoplastic material of the support portion 24 and the reinforcing composite layer 26. In such a configuration, the polyurethane is selected to have properties such that the polyurethane layer is conducive to melt bonding with both the thermoplastic material of the support portion 24 and the polymeric material of the reinforcing composite layer 26. Such a configuration increases the range of materials from which the thermoplastic material and the polymeric material may be selected from because in such a configuration the thermoplastic material and the polymeric material are not required to be melt bondable to each other but rather to the polyurethane layer.

As best shown in FIG. 8C, in the alternative or in addition to melt bonding, the connecting end 32 of the support portion 24 is mechanically interlocked with the connecting portion 34 of the reinforcing composite layer 26. Specifically, the connecting portion 34 of the reinforcing composite layer 26 defines a hole 38 and the connecting end 32 of the support portion 24 is further defined as a plug 40 extending through and engaging the reinforcing composite layer 26 through the hole 38.

As best shown in FIGS. 5A-C, preferably the plurality of fibers 28 is further defined as a plurality of continuous fibers 30 as opposed to discontinuous fibers, i.e., short fibers. The continuous fibers 30 are elongated such that stress on the reinforcing composite layer 26 is transmitted from the polymeric material to the continuous fibers 30 such that the continuous fibers 30 reinforce the polymeric material. In other words, the stress is transferred to the continuous fibers 30 such that the polymeric material does not deform around the continuous fibers 30 when the reinforcing composite layer 26 is subjected to a load. The continuous fibers 30 impregnated and uniformly coated with the polymeric material. For example, the continuous fibers 30 each extend in generally the same direction and extend along a length of the reinforcing composite layer 26. In the configuration where the reinforcing composite layer 26 comprises continuous fibers 30, the reinforcing composite layer 26 by itself is flexible about an axis extending along the continuous fibers 30 and is subject to buckling when subjected to a load. The support portion 24 supports the reinforcing composite layer 26 to prevent flexing about the axis and to prevent buckling when subjected to a load. It should be appreciated that, alternatively, the plurality of fibers 28 are discontinuous, i.e., short fibers. In the configuration where the plurality of fibers 28 are discontinuous, the polymeric material deforms around the fibers 28 and little stress is transferred from the polymeric material to the fibers 28.

Whether continuous, discontinuous, or otherwise, each of the plurality of fibers 28 preferably extend generally in the same direction. Alternatively, the plurality of fibers may extend in different directions or may be woven, i.e., interlaced with each other. The plurality of fibers 28 of the reinforcing composite layer 26 are preferably glass fibers. Alternatively, the plurality of fibers 28 are carbon fiber; however, it should be appreciated that the fiber 28 may be of any type known to one skilled in the art.

As best shown in FIGS. 5A-C, preferably the composite component 20 includes a plurality of reinforcing composite layers 42. In such a configuration, preferably each of the plurality of reinforcing composite layers 42 are integrally stacked upon each other forming a single stack 48. The stiffness and impact strength of the composite component 20 is increased with the addition of each reinforcing composite layer 42. The plurality of reinforcing composite layers 42 forming the single stack 48 may have a total thickness of approximately 1 to 2 mm.

The plurality of reinforcing composite layers 42 may include any combination of reinforcing composite layers 26 having continuous or discontinuous fibers. For example, the plurality of reinforcing composite layers 42 may include a plurality of reinforcing composite layers 42 having the continuous fibers 30, a plurality of reinforcing composite layers 42 having woven fibers, or a combination of at least one reinforcing composite layer 26 having continuous fibers 30 and at least one reinforcing composite layer 26 having woven fibers.

In the configuration where the composite component 20 includes the plurality of reinforcing composite layers 42, the material of the fibers 28 of each reinforcing composite layer 26 may be the same as or different than the fibers 28 of each of the other reinforcing composite layers 26. For example, the fibers 28 of each of the reinforcing composite layers 26 may be glass fibers, the fibers 28 of each of the reinforcing composite layers 26 may be carbon fibers, or the plurality of reinforcing composite layers 42 may include a combination of one or more reinforcing composite layers 26 having glass fibers and one or more reinforcing composite layers 26 having carbon fibers.

As shown in FIGS. 5A-C, in the configuration where each of the composite layers 26 has continuous fibers 30, preferably at least a first reinforcing composite layer 44 is oriented with the continuous fibers 30 extending in a first direction D and at least a second reinforcing composite layer 46 is oriented with the continuous fibers 30 extending angularly relative to the first direction D. In other words, the plurality of reinforcing composite layers 42 may be arranged such that the fibers 28 of at least one reinforcing composite layer 26 extend angularly relative to the fibers 28 of other reinforcing composite layers 26. Alternatively, the plurality of reinforcing composite layers 42 may be arranged such that the continuous fibers 30 of each reinforcing composite layer 42 extends in parallel with the fibers 28 of the other reinforcing composite layers 26.

Several configurations of the plurality of reinforcing composite layers 42 are shown in FIGS. 5A-C. Specifically, FIG. 5A shows an exploded view of a configuration of the plurality of reinforcing composite layers 42 including six reinforcing composite layers 26 each having continuous fibers 30. Moving upwardly from the bottom in the configuration shown in FIG. 5A, one reinforcing composite layer 26 has fibers 28 extending in the first direction D, the next reinforcing composite layer 26 has fibers 28 extending generally at 90° relative to the first direction D, the next two reinforcing composite layers 26 each have fibers 28 extending generally along the first direction D, the next reinforcing composite layer 26 has fibers 28 extending generally at 90° relative to the first direction D, and the next reinforcing composite layer has fibers 28 extending along the first direction D.

FIG. 5B shows an exploded view of another configuration of the plurality of reinforcing composite layers 42 including six reinforcing composite layers 26 each having continuous fibers 30. Moving upwardly from the bottom in the configuration shown in FIG. 5B, two reinforcing composite layers 26 each have fibers 28 extending in the first direction D, the next two reinforcing composite layers 26 each have fibers 28 extending generally at 90° relative to the first direction D, and the next two reinforcing composite layers 26 each have fibers 28 extending generally in the first direction D.

FIG. 5C shows an exploded view of another configuration of the plurality of reinforcing composite layers 42 including seven reinforcing composite layers 26 each having continuous fibers 30. Moving upwardly from the bottom in the configuration shown in FIG. 5C, three reinforcing composite layers 26 each have fibers 28 extending in the first direction D, the next reinforcing composite layer 26 has fibers 28 extending at 90° relative to the first direction D, and the next three reinforcing composite layers 26 each have fibers 28 extending in the first direction D.

As shown in FIGS. 1-3 and 8A-C, the support portion 24 defines ribs 25 and the ribs 25 present the connecting end 32. The reinforcing composite layer 26 defines a cavity 50 and the ribs 25 are disposed in the cavity 50. Specifically, the reinforcing composite layer 26 is concave with a base 52 and a pair of sides 54. Each of the pair of sides 54 is spaced from the other and extend from the base 52 defining the cavity 50 therebetween. As best shown in FIGS. 8A-C, the reinforcing composite layer 26 is U-shaped. The ribs 25 extend between and are integrated with the pair of sides 54 and the base 52.

As shown in FIG. 8B, the support portion 24 includes a thermal mass abutting the reinforcing composite layer 26. It should be appreciated that the thermal mass is disposed at an interface of the support portion 24 and the reinforcing composite layer 26 and, as shown in FIG. 8B, the ribs 25 include the thermal mass 56 abutting the reinforcing composite layer 26. As will be discussed below, in the configuration where the support portion 24 is melt bonded to the reinforcing composite layer 26, the thermal mass 56 heats the reinforcing composite layer 26 for melting the polymeric material reinforcing composite layer 26.

Figure 2:
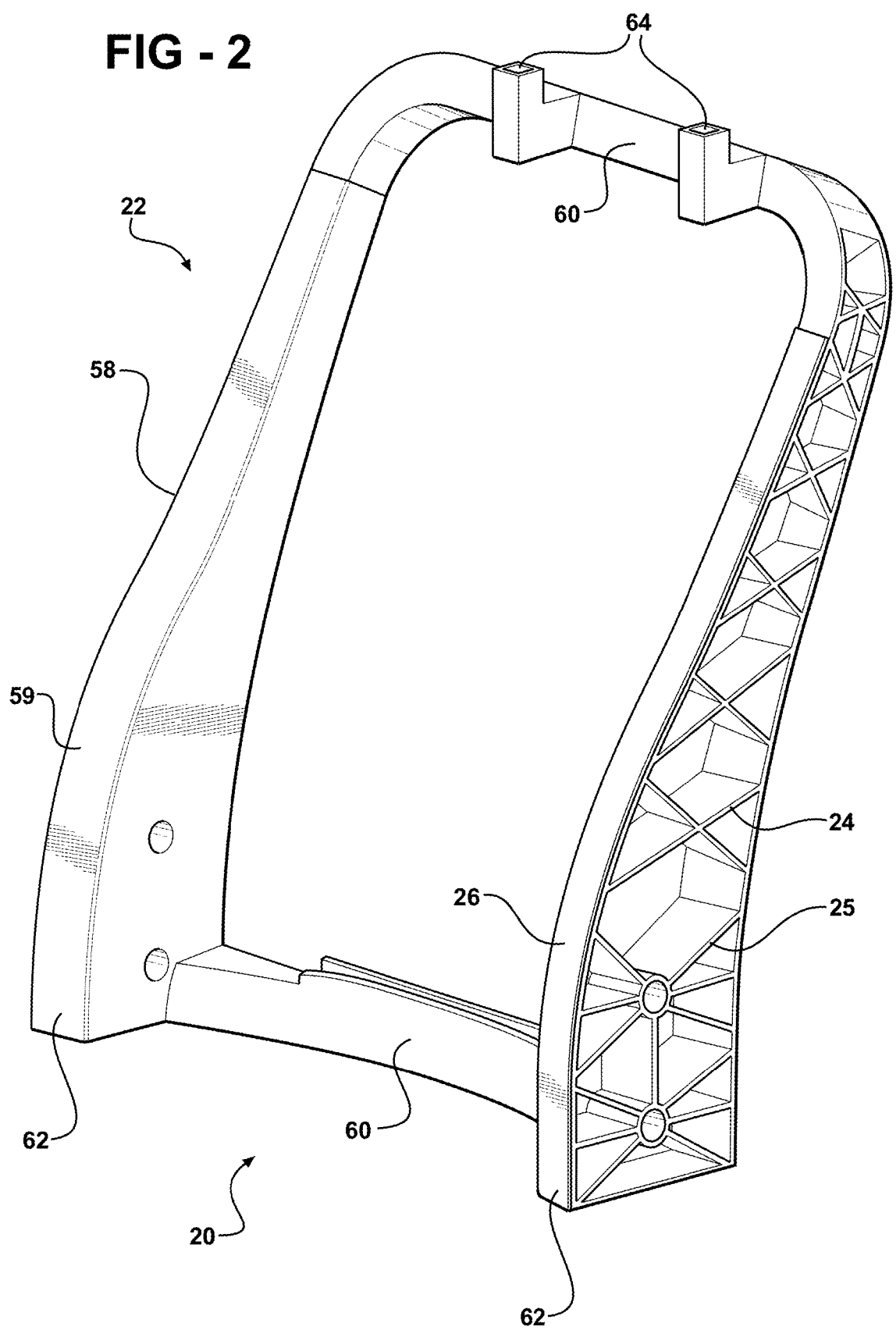
FIG. 2 is a perspective view of another embodiment of the seat back including a cross member.
Figure 3:
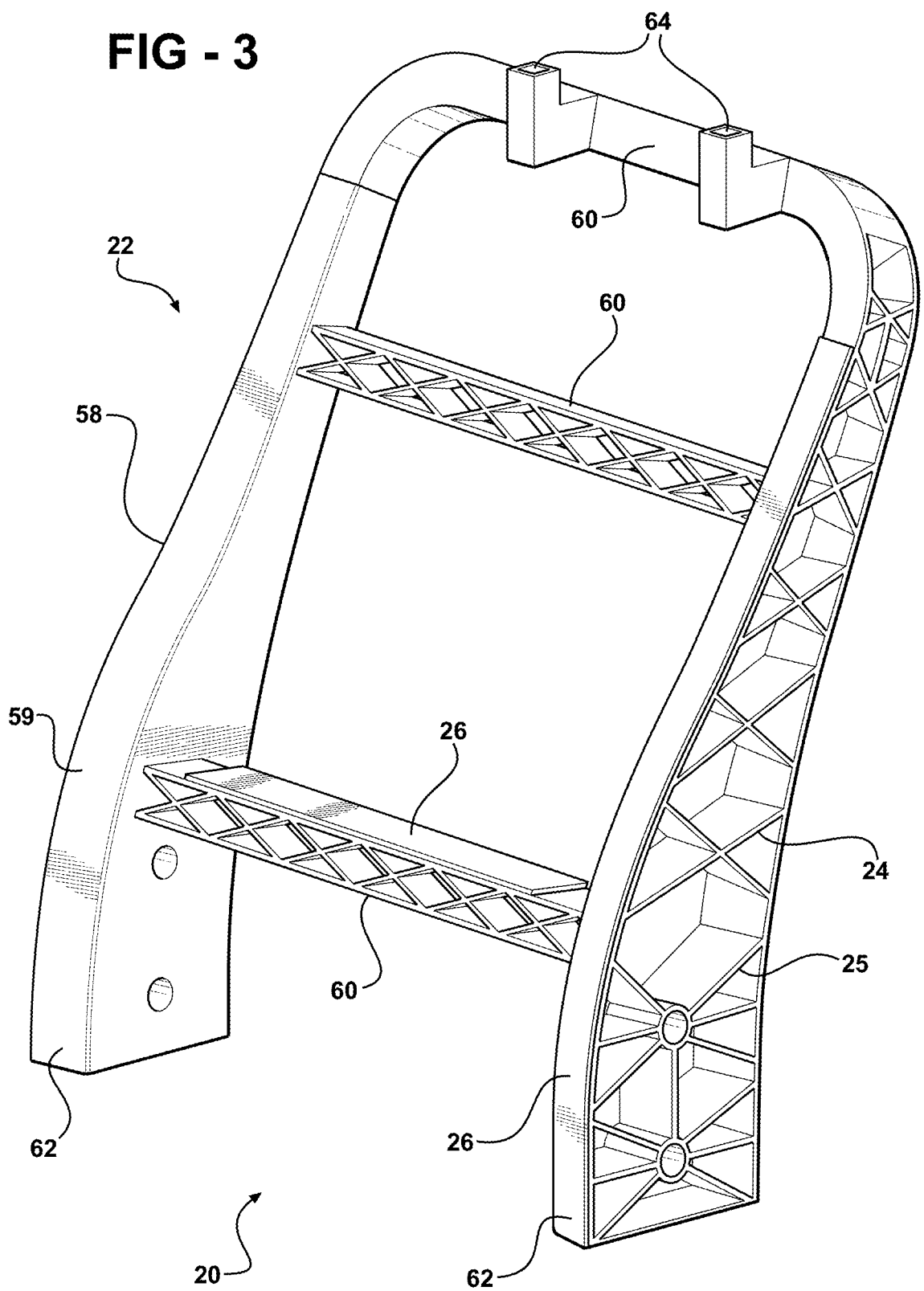
FIG. 3 is a perspective view of another embodiment of the seat back including a cross member and a cross member composite layer integrated with the cross member.
Figure 4:
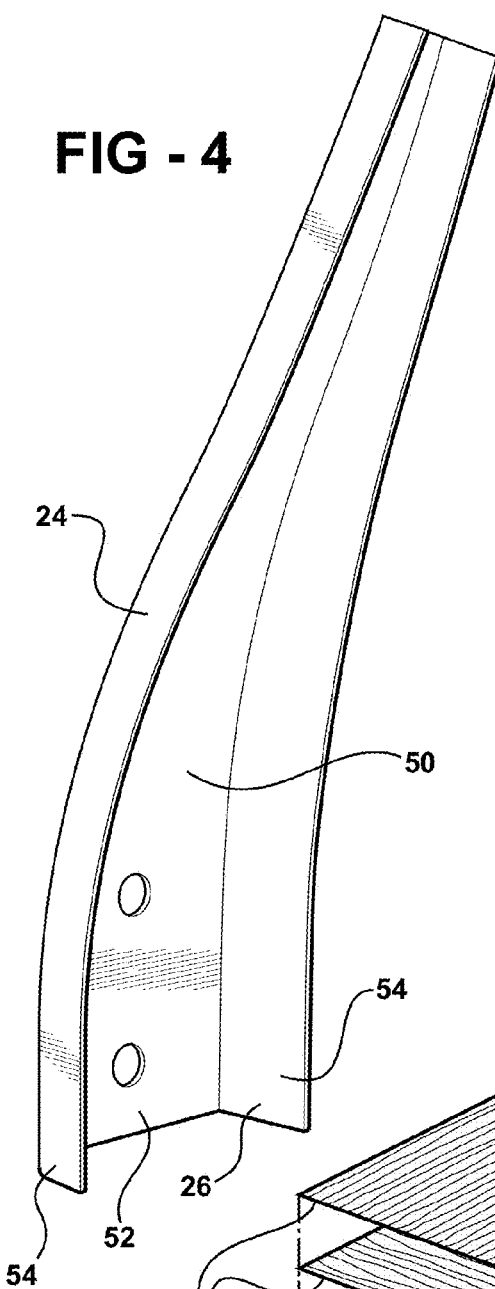
FIG. 4 is a perspective view of the reinforcing composite layer.

With respect to the seat back 22 as shown in FIGS. 1-3, the seat back 22 includes a second support portion 58 spaced from the support portion 24 and another reinforcing composite layer 59 integrated with the second support portion 58. The second support portion 58 comprises the same type of thermoplastic material as the support portion 24 and the another reinforcing composite layer 59 comprises the same type of material as the reinforcing composite layer 26. Typically, the second support portion 58 and the another reinforcing composite layer 59 are a mirror image of the support portion 24 and the reinforcing composite layer 26.

The seat back 22 typically includes at least one cross member 60 extending between the support portion 24 and the second support portion 58 for increasing the strength and stiffness of the seat back 22. The cross member 60 comprises the thermoplastic material and is integral with the support portion 24 and the second support portion 58. Specifically, as shown in FIGS. 1-3, the seat back 22 is generally U-shaped with a pair of legs 62 spaced from each other and extending generally in parallel. The cross member 60 extends between and is coupled to the pair of legs 62. One of the pair of legs 62 is defined by the support portion 24 and the reinforcing composite layer 26 and the other of the pair of legs 62 is defined by the second support portion 58 and the other reinforcing composite layer 59. The reinforcing composite layer 26 and the other composite layer 59 extend along one of the pair of legs 62, respectively, to reinforce the support portion 24 and the second support portion 58, respectively. Specifically, the reinforcing composite layer 26 and the second reinforcing composite layer 28 reinforce the support portion 24 and the second support portion 58, respectively, from buckling or cracking when subjected to loads. The reinforcing composite layer 26 may be located at critical areas of the seat back 22 to increase the impact stiffness of the seat back 22.

The thermoplastic material defines seat back features integral, i.e., one-piece, with the support portion 24, the second support portion 58, and/or the cross member 60. Specifically, as shown in FIGS. 1-3, the cross member 60 defines headrest guides 64. The cross member 60 receives a headrest (not shown) in the headrest guides 64. It should be appreciated that the support portion 24, the second support portion 58, and the cross member 60 may define any seat back feature known to one skilled in the art such as, but not limited to, a back panel, side bolsters, trim attachments, foam supports, back supports, armrest mounts, lumbar support, airbag mounts and/or housing, back suspension mounts, and any combination thereof. It should also be appreciated that the seat back features such as the back panel and the side bolsters may present class A surfaces, i.e., surfaces that are exposed to occupants of the vehicle. For example, in the scenario where the support portion is formed by plastic injection molding, the seat back features are also formed along with the support portion by plastic injection molding.

In one configuration, cross member composite layer 61 is integrated with the cross member 60 to reinforce the cross member 60. The cross member composite layer 61 typically comprises the same materials such as that described herein with respect to the reinforcing composite layer 26 and is typically formed in a manner such as that described herein with respect to the reinforcing composite layer 26. The cross member composite layer 61 is also typically integrated with the cross member 60 in a manner such as that described herein with respect to the integration of the support portion 24 and the reinforcing composite layer 26. It should be appreciated that the seat back 22 may include any number of reinforcing composite layers 26 and each reinforcing composite layer 26 may be located anywhere along the seat back 22.

The present invention further includes a method of forming the composite component 20. The composite component 20 is formed with a mold 66. Specifically, the method includes the steps of placing the reinforcing composite layer 26 into the mold 66, heating the thermoplastic material to a molten state, and disposing the thermoplastic material in the molten state into contact with the reinforcing composite layer 26. The method further includes promoting interaction between the thermoplastic material of the support portion 24 and the polymeric material of the reinforcing composite layer 26 to integrate the support portion 24 and the reinforcing composite layer 26.

Typically, the step of heating the thermoplastic material and disposing the thermoplastic material in to the mold 66 is further defined as injection molding with the use of the injection mold 36. In such a configuration, the step of disposing the thermoplastic material into the mold 66 includes injecting the thermoplastic material into the injection mold 36 under pressure.

Figure 7:
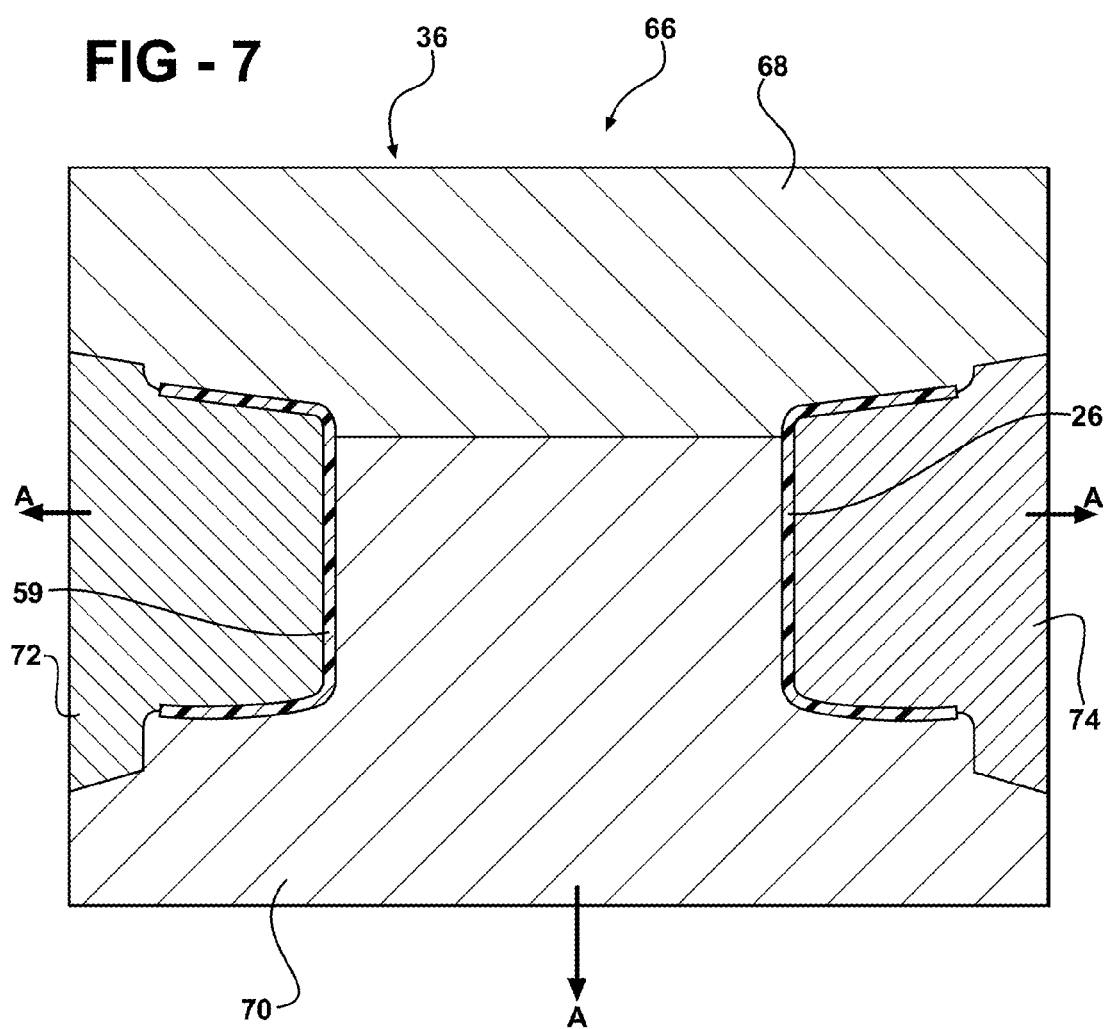
FIG. 7 is a schematic view of a mold with the reinforcing composite layer disposed in the mold.

As shown in FIG. 7, the injection mold 36 includes a main cavity 68 and a main core 70. The main cavity 68 and the main core 70 are moveable relative to each other between a closed position for plastic injection into the injection mold 36 and an open position for removal of the composite component 20 from the injection mold 36. Specifically, as shown in FIG. 7, the injection mold 36 for the composite component 20 includes the main cavity 68, the main core 70, a first side core 72, and a second side core 74. In such a configuration, preferably the main cavity 68 remains stationary and the main core 70, the first side core 72, and the second side core 74 are moveable between the open and closed positions. Arrows A are shown in FIG. 7 to illustrate the movement of the main core 70, the first side core 72, and the second side core 74.

The method of the present invention includes the steps of moving the injection mold 36 to the open position, placing the reinforcing composite layer 26 in the injection mold 36, and moving the injection mold 36 to the closed position. The method further includes the step of injecting the thermoplastic material into the injection mold 36 such that the support portion 24 is formed by the thermoplastic material and is integrated with the reinforcing composite layer 26. Specifically, the reinforcing composite layer 26 presents a contact surface 79 and the thermoplastic material is introduced into contact with the reinforcing composite layer 26 along the contact surface 79.

The step of promoting the interaction between the thermoplastic material of the support portion 24 and the polymeric material of the reinforcing composite layer 26 combines the thermoplastic material and the reinforcing composite layer 26 into a single unit. In other words, when the thermoplastic material in the molten state is introduced into contact with the reinforcing composite layer, the thermoplastic material of the support portion 24 and the polymeric material of the reinforcing composite layer 26 interact with one another such that upon cooling, the support portion 24 and the reinforcing composite layer 26 are integral with each other, i.e., one-piece.

The step of promoting interaction is further defined as melt bonding the thermoplastic of the support portion 24 and the polymeric material of the reinforcing composite layer 26. Specifically, the method includes melting at least a portion of the polymeric material of the reinforcing composite layer 26 in contact with the thermoplastic material in the molten state to melt bond the composite and the thermoplastic material upon cooling. Melt bonding occurs when the thermoplastic material in the molten state interacts with the polymer of the reinforcing composite layer 26 while the polymeric material is in a heated softened state or a molten state. The thermoplastic material and the polymeric material interact with one another such that upon cooling the thermoplastic material and the polymeric material are bonded together. Specifically, heat may be transferred from the thermoplastic material in molten state to the polymeric material. The heat softens or melts the polymeric material and the softened or melted polymeric material interacts with the thermoplastic material in the molten state.

In the configuration where the first melting temperature of the thermoplastic material is greater than the second melting temperature of the polymeric material, the step of melting the polymeric material is further defined as disposing the thermoplastic material at the first melting temperature into contact with the reinforcing composite layer 26 such that the second melting temperature is realized during contact. When the thermoplastic material at the first melting temperature is introduced into contact with the reinforcing composite layer 26, heat is transferred from the thermoplastic material to the polymeric material such that the temperature of the polymeric material is increased to the first melting temperature, thereby melting the polymeric material.

The step of melting the polymeric material is further defined as disposing the thermal mass 56 of thermoplastic material in the molten state into contact with the composite layer to transfer heat from the thermal mass 56 to the polymeric material. The thermal mass 56 is best shown in FIG. 8B. The thermal mass 56 heats the reinforcing composite layer 26 at the interface of the reinforcing composite layer 26 and the thermoplastic to melt the polymeric material of the reinforcing composite layer 26. The thermal mass 56 is thicker than the rib 25 to provide a larger contact area with the thermoplastic material and holds more heat energy than the rib 25 alone.

In addition to heat transfer from the thermoplastic material, the melting of the polymeric material of the reinforcing composite layer 26 may be promoted in a variety of ways. For example, the step of melting the polymeric material is further defined as heating the mold 66 to conductively heat the reinforcing composite layer 26. The reinforcing composite layer 26 is heated such that less heat energy is required from thermoplastic material in the molten state to raise the polymeric material to the second melting temperature.

Alternatively, or in addition, the method may include heating the reinforcing composite layer 26 prior to disposing the thermoplastic material in the molten state into contact with the reinforcing composite layer 26. For example, the method may include heating the reinforcing composite layer 26 prior to placing the reinforcing composite layer 26 into the mold 66. Alternatively or in addition, the method may include the step of heating the reinforcing composite layer 26 while the reinforcing composite layer 26 is disposed in the mold 66.

For example, the method may include the step of insulating the mold 66 near the interface of the thermoplastic material and the reinforcing composite layer 26. Specifically, in the configuration where introduction of the thermoplastic material into the mold 66 is further defined as plastic injection molding, the process of plastic injection molding heats the injection mold 36 and the step of insulating the injection mold 36 maintains heat in the injection mold 36. The heat of the injection mold 36 softens the polymeric material of the reinforcing composite layer 26 to foster melt bonding between the thermoplastic material and the polymeric material when the thermoplastic material is injected into the injection mold 36.

The method may include the step of heating the mold 66 near the interface of the thermoplastic material and the reinforcing composite layer 26. For example, the mold 66 may include heated oil lines carrying heated oil. Heat is transmitted from the oil to the mold 66 to heat the mold 66. The heat transferred to the mold 66 by the oil lines softens the polymeric material to foster melt bonding between the thermoplastic material and the polymeric material when the thermoplastic material is introduced into contact with the polymeric material.

The method may include the step of blowing heated air on the reinforcing composite layer 26 to heat the reinforcing composite layer 26. For example, the mold 66 may include an air pocket and heated air is blown from the air pocket onto the reinforcing composite layer 26 when the reinforcing composite layer 26 is disposed in the mold 66. The heated air may be directed to blow on the reinforcing composite layer 26 at the interface of the thermoplastic material and the reinforcing composite layer 26 prior to introduction of the thermoplastic material to the interface. The heated air softens the polymeric material of the reinforcing composite layer 26 to foster melt bonding between the thermoplastic material and the reinforcing composite layer 26 when the thermoplastic material is introduced into contact with the reinforcing composite layer 26.

The method may include the step of plasma treating or flame treating the reinforcing composite layer 26 to relieve surface tension of the reinforcing composite layer 26. The plasma treatment or flame treatment is applied to the reinforcing composite layer 26 at the interface of the thermoplastic material and the reinforcing composite layer 26 prior to introduction of the thermoplastic material to the interface. The plasma treatment or flame treatment of the reinforcing composite layer 26 reduces surface tension and which promotes melt bonding between the thermoplastic material and the reinforcing composite layer 26.

The method may include the step of contacting the reinforcing composite layer 26 with plasma treat inserts to heat the reinforcing composite layer 26. The plasma treat inserts are contacted with the reinforcing composite layer 26 at the interface of the thermoplastic material and the reinforcing composite layer 26 prior to introduction of the thermoplastic material to the interface. The plasma treat inserts are removed from the reinforcing composite layer 26 prior to the introduction of the thermoplastic material to the interface. The plasma treat inserts soften the reinforcing composite layer 26 to foster melt bonding between the thermoplastic material and the reinforcing composite layer 26 when the thermoplastic material is introduced into contact with the reinforcing composite layer 26.

Alternatively, the step of promoting interaction is further defined as mechanically interlocking the support portion 24 and the reinforcing composite layer 26. Specifically, the step is further defined as introducing the thermoplastic material in the molten state through the hole 38 to define the plug 40 extending through and engaging the reinforcing composite layer 26 through the hole 38 upon cooling of the thermoplastic material. Upon cooling, the thermoplastic material is mechanically interlocked with the reinforcing composite layer 26.

Alternatively, or in addition to melt bonding and mechanical interlocking, the step of promoting interaction is further defined as scarifying the contact surface 79 prior to disposing the thermoplastic material in the molten state into contact with the reinforcing composite layer 26. In other words, the contact surface 79 is roughened to promote melting of the reinforcing composite layer 26 at the contact surface.

The step of promoting interaction is further defined as applying an adhesion promoter onto the reinforcing composite layer 26 prior to disposing the thermoplastic material in the molten state into contact with the reinforcing composite layer 26. For example, the adhesion promoter is applied to the reinforcing composite layer 26 by spraying, brushing, and/or bathing. The adhesion promoter promotes the melt bonding between the thermoplastic material of the support portion 24 and the polymeric material of the reinforcing composite layer 26. An example of such an adhesion promoter is Gamma-aminopropyl triethoxysilane such as that commercially available from Dow Corning located in Midland, Mich. under the tradename Z-6011 Silane. Another example of such an adhesion promoter is Methylendiphenylbishexahydroazepincarboxamid such as that commercially available from EMS-Primid located in Sumter, S.C. under the tradename Grilbond IL-6.

The method also typically includes the step of preforming the reinforcing composite layer 26 into a predetermined shape prior to placing the reinforcing composite layer 26 into the mold 66. The step of preforming is further defined as thermoforming. Alternatively, the step of preforming is further defined as compression molding. In the configuration including the plurality of reinforcing composite layers 42, the plurality of reinforcing composite layers 42 are combined as the single stack 48 by compression thermoforming or compression molding. It should also be appreciated that the mold 66 is configured such that the reinforcing composite layer 26 is bent or deformed when placed in the mold 66. In such a configuration, the reinforcing composite layer 26 maintains such a bend or deformation after the thermoplastic material is integrated with the reinforcing composite layer 26.

The reinforcing composite layer 26 is typically preformed with the use of a preforming mold 76. The preforming mold 76 includes a female preforming mold half 78 having a preforming cavity 80 corresponding to the predetermined shape and a male preforming mold half 82 corresponding to the preforming cavity 80. In the configuration where the reinforcing composite layer 26 is preformed by thermoforming, reinforcing composite layer 26 is heated and placed in the preforming cavity 80 whereby the male preforming mold half 82 exerts force on the reinforcing composite layer 26 to permanently deform the reinforcing composite layer 26 in the preforming cavity 80. In the configuration where the reinforcing composite layer 26 is preformed by compression molding, the reinforcing composite layer 26 is placed in the preforming cavity 80 and the male preforming mold half 82 exerts force on the reinforcing composite layer 26 to permanently deform the reinforcing composite layer 26 in the preforming cavity 80.

The predetermined shape is determined based on the structural reinforcement that the reinforcing composite layer 26 is to provide to the composite component 20. In the configuration where the thermoplastic is injection molded, the predetermined shape corresponds to the shape of the main cavity 68 or the shape of the main core 70. The reinforcing composite layer 26 is typically positioned flush with the main cavity 68 or the main core 70 when the reinforcing composite layer 26 is disposed in the injection mold 36. In such a configuration, the thermoplastic material contacts one side 54 of the reinforcing composite layer 26 such that the reinforcing composite layer 26 partially forms an exterior of the composite component 20. Specifically, with the seat back 22, the reinforcing composite layer 26 is shaped to correspond to the shape of one of the legs 62. It should be appreciated that the reinforcing composite layer 26 may also be positioned in the injection mold 36 such that the plastic encapsulates the reinforcing composite layer 26.

The method further includes the step of combining the plurality of composite layers 42 into the single stack 48. The step of combining the plurality of composite layers 42 includes positioning at least one of the plurality of reinforcing composite layers with the continuous fibers 30 extending in the first direction D and positioning at least another of the plurality of reinforcing composite layers 42 with the continuous fibers 30 extending angularly relative the first direction D.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A seat back for a vehicle, said seat back comprising:
a pair of side bolsters and a back member extending between said side bolsters;
each of said side bolsters including a support portion and a reinforcing composite layer;
said support portion of each of said side bolsters including a thermoplastic material initially separate from said reinforcing composite layer;
said back member including said thermoplastic material and being integral with said thermoplastic material of said support portion;
said reinforcing composite layer of each of said side bolsters including a polymeric material and a plurality of continuous fibers impregnated in said polymeric material;
wherein each reinforcing composite layer of each of said side bolsters is concave with a base and a pair of sides spaced from each other and extending from said base defining a cavity disposed therebetween with each of said base and said pair of sides defining continuous contact surfaces facing said cavity;
at least one cross member extending between one side of said base of said support portion of each of said side bolsters opposite said contact surfaces of said base;
said at least one cross member including said thermoplastic material and being integral with the one side of said base of said support portion of each of said side bolsters;
wherein said thermoplastic material of said support portion is disposed in said cavity along at least a portion of said contact surfaces of at least said base and said pair of sides of said reinforcing composite layer and defining a set of ribs extending from said contact surfaces of said base and said sides and interaction between said thermoplastic material and said polymeric material integrates by melting a portion of said polymeric material with said thermoplastic material in a molten state;
wherein said support portion extends between and is integrated with said polymeric material of said pair of sides and said base and said ribs of said reinforcing composite layer of each of said side bolsters;
wherein said thermoplastic material of said at least one cross member extends between and is integrated with said polymeric material of said base of said support portion of each of said side bolsters;
wherein said polymeric material and said thermoplastic material are cooled to define said base of each of said side bolsters as integrated combinations of said thermoplastic material and said reinforcing composite layer, respectively, and to at least partially define each of said sides as an integrated combination of said thermoplastic material and said reinforcing composite layer, respectively, with said base and said sides being integrated with each other such that said reinforcing composite layer reinforces said support portion to resist fracturing of said support portion when subjected to a load as said support portion extends between and simultaneously supports said reinforcing composite layer; and
wherein said side bolsters, said at least one cross member, and said back member are integral.

2. The seat back as set forth in claim 1 wherein said thermoplastic material presents a class A surface.

3. The seat back as set forth in claim 1 wherein said thermoplastic material presents a class A surface along said back member.

4. The seat back as set forth in claim 1 wherein said thermoplastic material presents a class A surface along said side bolsters.

5. The seat back as set forth in claim 1 wherein said thermoplastic material of said support portion defines headrest guides integral with said support portion for receiving a headrest.

6. The seat back as set forth in claim 1 wherein said thermoplastic material is capable of being formed into said support portions by injection molding in an injection mold and wherein said thermoplastic material is a net-shaped product when removed from the injection mold.

7. The seat back as set forth in claim 1 wherein said reinforcing composite layer is thin relative to said support portion.

8. The seat back as set forth in claim 1 wherein each reinforcing composite layer is between 1 mm to 2 mm thick.

9. The seat back as set forth in claim 1 wherein said thermoplastic material has a first melting temperature and the polymeric material has a second melting temperature less than said first melting temperature to promote bonding between said thermoplastic material and said polymeric material during injection molding.

10. The seat back as set forth in claim 1 wherein said support portion is disposed in said cavity of said reinforcing composite layer.

11. The seat back as set forth in claim 1 wherein at least one of said reinforcing composite layers defines a hole and said thermoplastic material of said support portion extends through said hole and engages said hole.

12. The seat back as set forth in claim 1 further comprising foam disposed on said support portion.

13. The seat back as set forth in claim 1 wherein said thermoplastic material of said support portion is further defined as fiber reinforced nylon.

14. The seat back as set forth in claim 13 wherein said polymeric material of said reinforcing composite layers is further defined as nylon.

15. The seat back as set forth in claim 1 wherein each reinforcing composite layer is defined by a plurality of layers each including said continuous fibers impregnated in said polymeric material, each of said layers integrally stacked upon each other.

16. The seat back as set forth in claim 15 wherein said continuous fibers at least one of said layers extend in a first direction and said continuous fibers of at least another of said layers extend in a second direction different than said first direction.

17. The seat back as set forth in claim 16 wherein said first and second directions are perpendicular to each other.

18. A seat back for a vehicle, said seat back comprising:
a pair of side bolsters whereby each side bolstering including a support portion including a thermoplastic material and a plurality of reinforcing composite layers initially separate from said thermoplastic material, said support portion defining an axis along a length thereof;
each of said reinforcing composite layers including a polymeric material and a plurality of continuous fibers impregnated in said polymeric material;
at least one of said reinforcing composite layers positioned with said continuous fibers extending in a first direction along the axis;
at least another of said reinforcing composite layers positioned with said continuous fibers extending angularly relative the first direction and the axis;
said reinforcing composite layers being combined into a single integral stack with said continuous fibers extending in at least two different directions;
wherein said stack of said reinforcing composite layers is concave and has a base and a pair of sides spaced from each other and extending from said base with a cavity disposed therebetween with each of said base and said pair of sides defining continuous contact surfaces facing said cavity;
at least one cross member extending between one side of said support portion of each of said side bolsters opposite said contact surfaces of said base;
wherein said at least one cross member includes a thermoplastic material and is integral with the one side of said base of said support portion of each of said side bolsters;
wherein said thermoplastic material is disposed in said cavity along at least a portion of said contact surfaces of at least said base and said sides of said reinforcing composite layer and defining a set of ribs extending from said contact surfaces of said base and said sides and interaction between said thermoplastic material and said polymeric material integrates by melting a portion of said polymeric material in contact with said thermoplastic material in a molten state;
wherein said support portion extends between and is integrated with said sides and said base;
wherein said polymeric material and said thermoplastic material are cooled to define said base and said sides as an integrated combination of said thermoplastic material and said reinforcing composite layers, respectively, with said base and said sides being integrated with each other such that said reinforcing composite layers reinforce said support portion to resist fracturing of said support portion when subjected to a load transverse to the direction of said continuous fibers as said support portion extends between and simultaneously supports said reinforcing composite layers to reduce or prevent flexing about the axis.

19. The seat back as set forth in claim 18 wherein said thermoplastic material has a first melting temperature and said polymeric material has a second melting temperature less than said first melting temperature to promote bonding between said thermoplastic material and said polymeric material.

20. The seat back as set forth in claim 18 wherein said support portion defines ribs disposed in said cavity.

21. The seat back as set forth in claim 20 wherein said ribs are integrated with said base and said sides.

22. The seat back as set forth in claim 18 wherein said stack of said reinforcing composite layers is thin relative to said support portion to reduce a thickness of said seat back.

23. A seat back for a vehicle, said seat back comprising:
a pair of side bolsters whereby each side bolster including a support portion and a reinforcing composite layer initially separate from said support portion;
said support portion including a thermoplastic material;
said reinforcing composite layer including a polymeric material and a plurality of continuous fibers impregnated in said polymeric material;
wherein said reinforcing composite layer is concave with a base and a pair of sides spaced from each other and extending from said base defining a cavity disposed therebetween with each of said base and said pair of sides defining continuous contact surfaces facing said cavity;
said thermoplastic material being disposed in the molten state in the cavity in contact with said base and said sides of said reinforcing composite layer;
at least one cross member extending between one side of said base of said support portion of each of said side bolsters opposite said contact surfaces of said base;
wherein said at least one cross member includes a thermoplastic material and is integral with the one side of said base of said support portion of each of said side bolsters;
wherein said thermoplastic material is heated and disposed in contact with said base and said sides of said reinforcing composite layer and defining a set of ribs extending from said contact surfaces of said base and said sides and interaction between said thermoplastic material and said polymeric material integrates by heat said support portion with said reinforcing composite layer by melting a portion of said polymeric material with said thermoplastic material in a molten state; and
wherein said polymeric material and said thermoplastic material are cooled to define said base and said sides as an integrated combination of said thermoplastic material and said reinforcing composite layer, respectively, with said base and said sides being integrated with each other such that said reinforcing composite layer reinforces said support portion to resist fracturing of said support portion when subjected to a load as said support portion extends between and simultaneously supports said reinforcing composite layer.

24. The seat back as set forth in claim 23 wherein said reinforcing composite layer has a contact surface to contact said thermoplastic material in the molten state and said contact surface is scarifyed prior to said thermoplastic material being disposed in the molten state into contact with said reinforcing composite layer.

25. The seat back as set forth in claim 23 including an adhesion promoter disposed onto said reinforcing composite layer prior to said thermoplastic material being disposed in the molten state into contact with said reinforcing composite layer.

26. The seat back as set forth in claim 23 wherein said reinforcing composite layer is further defined as a plurality of composite layers and said composite layers being combined into a single integral stack.

27. The seat back as set forth in claim 26 wherein at least two of said composite layers include continuous fibers and wherein at least one of said composite layers with said continuous fibers extends in a first direction and at least another of said composite layers with said continuous fibers extends angularly relative the first direction.

28. The seat back as set forth in claim 26 wherein said continuous fibers of at least one of said composite layers extend along an axis and wherein said support portion supports said reinforcing composite layer to reduce or prevent flexing about the axis.

29. The seat back as set forth in claim 28 wherein said continuous fibers of at least one of said composite layers extends angularly to the axis.

30. The seat back as set forth in claim 23 wherein said thermoplastic material has a first melting temperature and the polymeric material has a second melting temperature less than said first melting temperature to promote bonding between said thermoplastic material and said polymeric material.

31. The seat back as set forth in claim 23 wherein said support portion defines ribs disposed in said cavity and integrated with said reinforcing composite layer.

\* \* \* \* \*

UNITED STATES PATENT AND TRADEMARK OFFICE
CERTIFICATE OF CORRECTION

| | | |
|---|---|---|
| PATENT NO. | : 9,168,855 B2 | Page 1 of 1 |
| APPLICATION NO. | : 13/730224 | |
| DATED | : October 27, 2015 | |
| INVENTOR(S) | : Jonathan A. Evans et al. | |

It is certified that error appears in the above-identified patent and that said Letters Patent is hereby corrected as shown below:

IN THE CLAIMS:

Column 15, line 7, please delete "bolstering" before "including" and replace with -- bolster --

Signed and Sealed this
Sixteenth Day of February, 2016

Michelle K. Lee
*Director of the United States Patent and Trademark Office*